United States Patent [19]

Langen

[11] 4,354,590
[45] Oct. 19, 1982

[54] SPACER ESCALATOR FOR SPACING LOADS IN CARTON LOADING MACHINES

[75] Inventor: Marinus J. M. Langen, Rexdale, Canada

[73] Assignee: H. J. Langen & Sons Ltd., Toronto, Canada

[21] Appl. No.: 269,431

[22] Filed: Apr. 28, 1980

Related U.S. Application Data

[63] Continuation of Ser. No. 873,000, Jan. 27, 1978, abandoned.

[51] Int. Cl.³ .................. B65G 47/26; B65G 17/32
[52] U.S. Cl. .................. 198/425; 198/461; 198/796
[58] Field of Search ............... 198/425, 443, 456, 457, 198/459, 461, 476, 792, 796–798

[56] References Cited

U.S. PATENT DOCUMENTS

| | | | |
|---|---|---|---|
| 2,888,125 | 5/1959 | Engelson | 198/461 |
| 3,721,330 | 3/1973 | Crawford | 198/461 |
| 3,795,302 | 3/1974 | Schoppe | 198/797 |
| 4,077,524 | 3/1978 | Rysti | 198/459 |
| 4,228,888 | 10/1980 | Bruno | 198/461 |
| 4,325,477 | 4/1982 | Heikinheimo | 198/461 |

Primary Examiner—Andres Kashnikow
Assistant Examiner—Brian Bond
Attorney, Agent, or Firm—Fetherstonhaugh & Co.

[57] ABSTRACT

In a carton loading machine having a load accumulating station, the improvement of a load spacing mechanism which includes an escalator for engaging load units and advancing one load unit with respect to the next following load unit so as to space the load units. The mechanism includes a transfer platform in the load accumulating station and an escalator extending upwardly and forwardly from below the transfer platform to a loading plane disposed above the platform and load carrying supports on the escalator and movable with the escalator along the escalator plane so as to support the load units for movement along the escalator plane.

3 Claims, 7 Drawing Figures

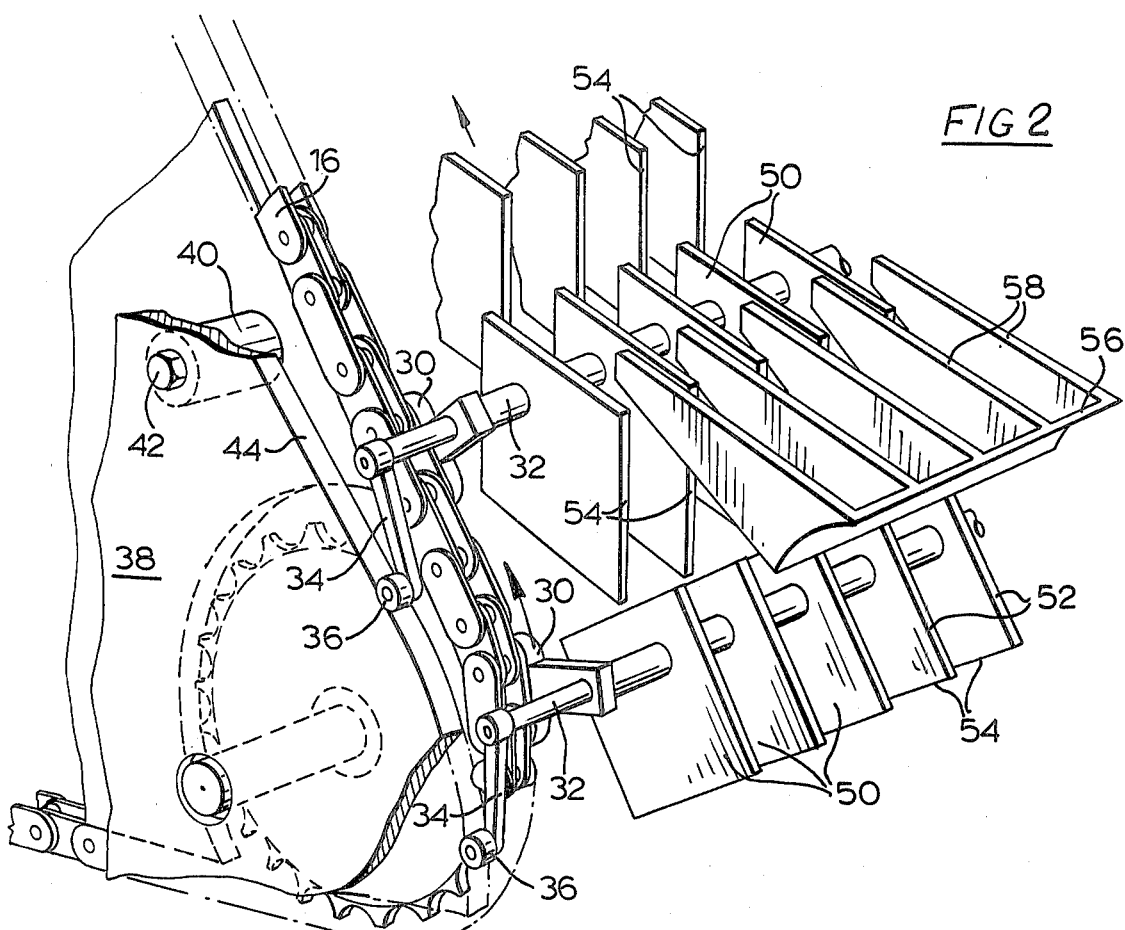
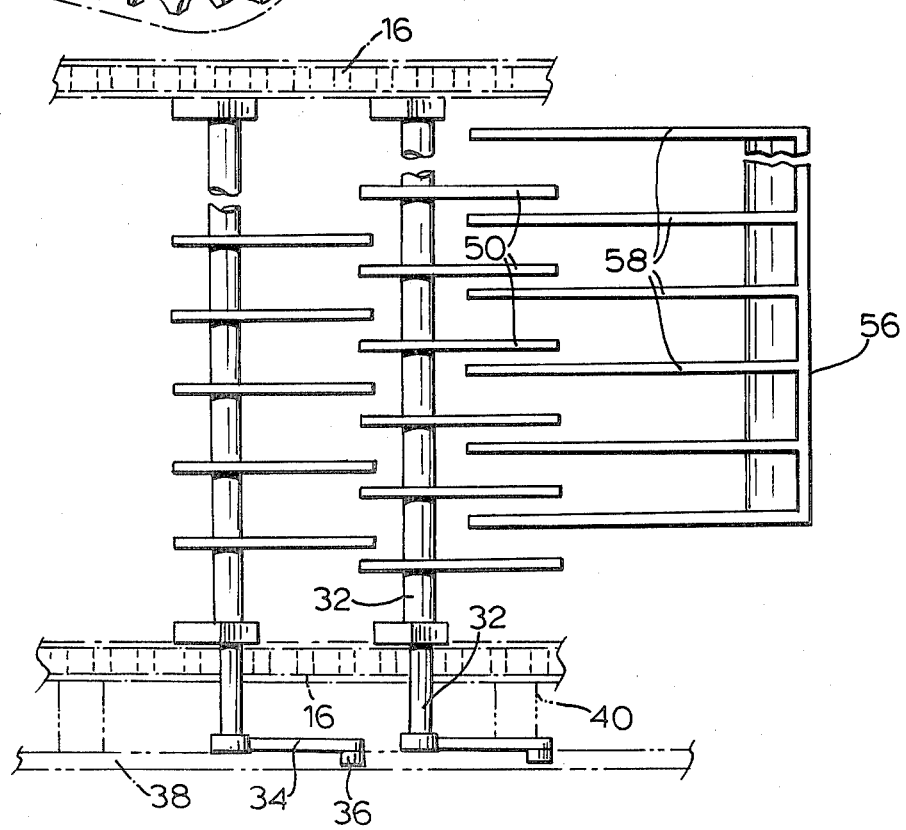

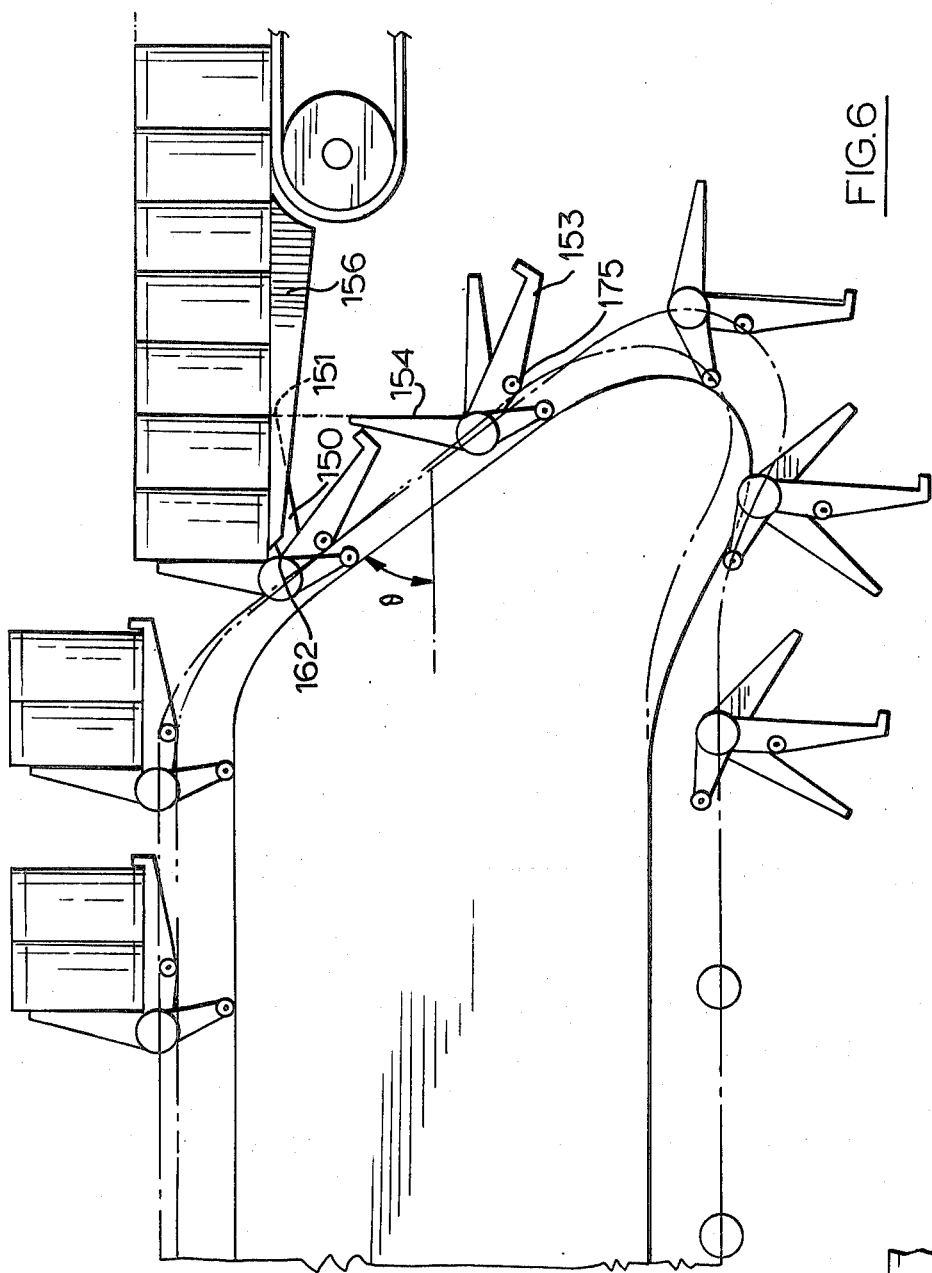
FIG.6
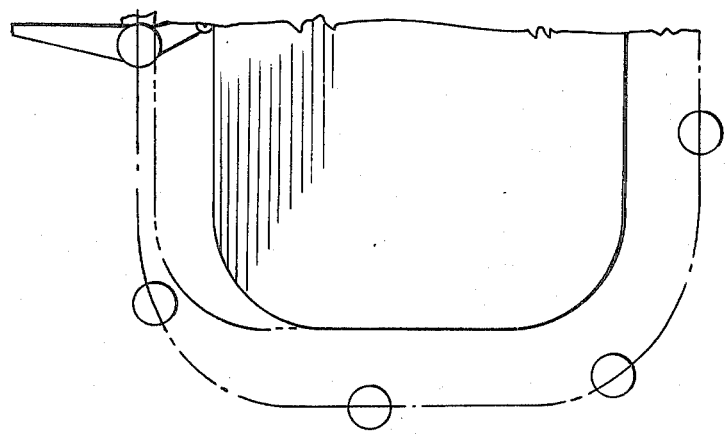
FIG.7
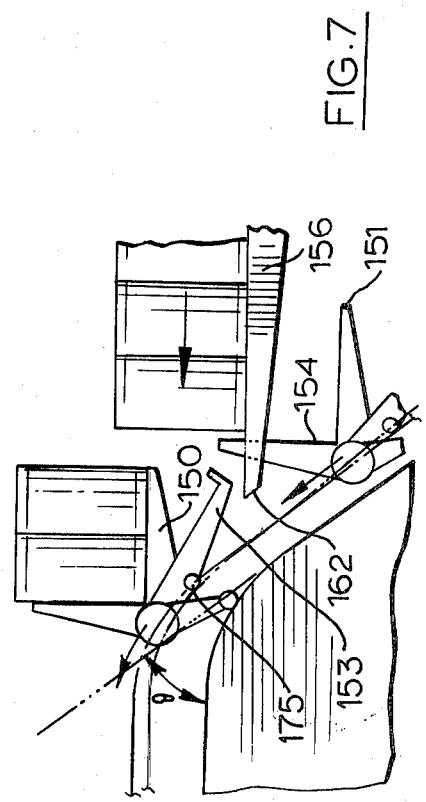

SPACER ESCALATOR FOR SPACING LOADS IN CARTON LOADING MACHINES

This is a continuation of application Ser. No. 873,000, filed Jan. 27, 1978, now abandoned.

FIELD OF THE INVENTION

This invention relates to improvement in mechanisms for spacing accumulated loads in carton end loading machinery and the like.

PRIOR ART

Carton can be end loaded at high speed with the carton end loading machinery presently available. Difficulty has, however, been experienced in attempting to separate the load which is to be inserted into one carton from an accumulation of load forming items. Generally it is necessary to have an accumulation of load forming items in a load accumulating station available for pick-up by the load transporting conveyor used for transporting the load to the end loading station. The items which are located in the load accumulating station are generally held in a substantially stationary condition awaiting pick-up by the loading conveyor. Because of the high speed of operation of loading conveyors, it is necessary to effect a rapid acceleration of the items onto the loading conveyor. Considerable difficulty has been experienced in effectively separating the leading load unit from the accumulated load units in the accumulating station and effectively transferring the leading load unit to the loading conveyor.

The apparatus of the present invention serves to separate the leading load unit from the accumulated load units in the load accumulating station at a forward velocity which is less than the forward velocity of the forward run of the loading conveyor.

The apparatus of the present invention effects transfer from the load accumulating station to the forward run of the loading conveyor by providing an escalator conveyor which simultaneously elevates and advances the leading load unit away from the load accumulating station.

It is an object of the present invention to provide a loading mechanism which will provide at least a two-stage acceleration of the loading units in transporting the loading units from a load accumulating station to a loading station.

It is a further object of the present invention to provide a loading mechanism which includes a conveyor which is driven at a constant linear speed and has an upwardly and angularly inclined run followed by a generally horizontal forwardly extending run and which engages load units during travel along the inclined run and spaces each successive load unit by reason of the change in forward velocity resulting from transfer from the inclined run to the forward run.

SUMMARY OF INVENTION

According to one aspect of the present invention, there is provided in a carton loading machine having a loading conveyor for supporting and transporting a plurality of longitudinally spaced load units in a forward direction along a forward run which extends in a loading plane to a loading station, a load accumulating station and means for feeding items to the load accumulating station, the improvement of a transfer platform in said load accumulating station disposed in a plane which is spaced below the loading plane and rearwardly from the forward run of said loading conveyor, escalator means extending upwardly and forwardly from below said transfer platform to said loading plane in an inclined escalator plane, load carrying support means on said escalator means and movable with said escalator means along said escalator plane through said transfer platform to engage and transport at least a portion of the accumulated load upwardly along said escalator plane to the loading plane for movement along the forward run of said loading conveyor.

According to a further aspect of the present invention, there is provided in a carton end loading machine having a loading conveyor for supporting and transporting a plurality of longitudinally spaced load units in a forward direction along a forward run which extends in a loading plane from a load accumulating station through a carton loading station, the loading conveyor also having a return run extending in a return plane located below the loading plane, a plurality of load carrying supports arranged at spaced intervals along said loading conveyor, feeding means for feeding items to said load accumulating station, the improvement of a transfer platform in said load accumulating station for receiving items from said feeding means, said transfer platform being disposed in a plane spaced below said loading plane, and wherein said loading conveyor includes an escalator run extending upwardly and inclined forwardly from said return run to said loading plane, said load carrying supports being adapted to pass upwardly and forwardly through said transfer platform as they are driven along said escalator run to engage and elevate at least a portion of the accumulated load from said transfer platform and to transport it to the loading station.

According to yet another aspect of the present invention, there is provided in a carton loading machine having a loading conveyor for supporting and transporting a plurality of longitudinally spaced load units in a forward direction along a forward run which extends in a loading plane to a loading station, a load accumulating station and means for feeding items to the load accumulating station, the improvement of a transfer platform in said load accumulating station disposed in a plane which is spaced below said loading plane and rearwardly from said forward run of said loading conveyor, an escalator conveyor having an escalator run extending upwardly and forwardly from below said transfer platform to said loading plane, a plurality of load carrying supports on said escalator conveyor each having a bottom support face and an end stop face, the end stop face being located rearwardly from the bottom support face to form a stop for the next following load unit, said end stop face emerging from below said transfer platform as the preceding bottom support face elevates and advances the leading load unit thereby to limit the forward movement of the next following load unit.

The invention will be more clearly understood after reference to the following detailed specification read in conjunction with the drawings, wherein FIG. 1 is a side view of an escalator mechanism for use in a carton loading machine according to one aspect of the present invention;

FIG. 2 is a pictorial view of a portion of the escalator run of the escalator mechanism;

FIG. 3 is a plan view of a portion of the escalator mechanism of FIG. 1;

FIG. 6 is a side view of the mechanism of FIG. 5; and

FIG. 7 is a side view illustrating the mechanism of FIG. 6 in a position advanced from the position illustrated in FIG. 6.

Figure 1:
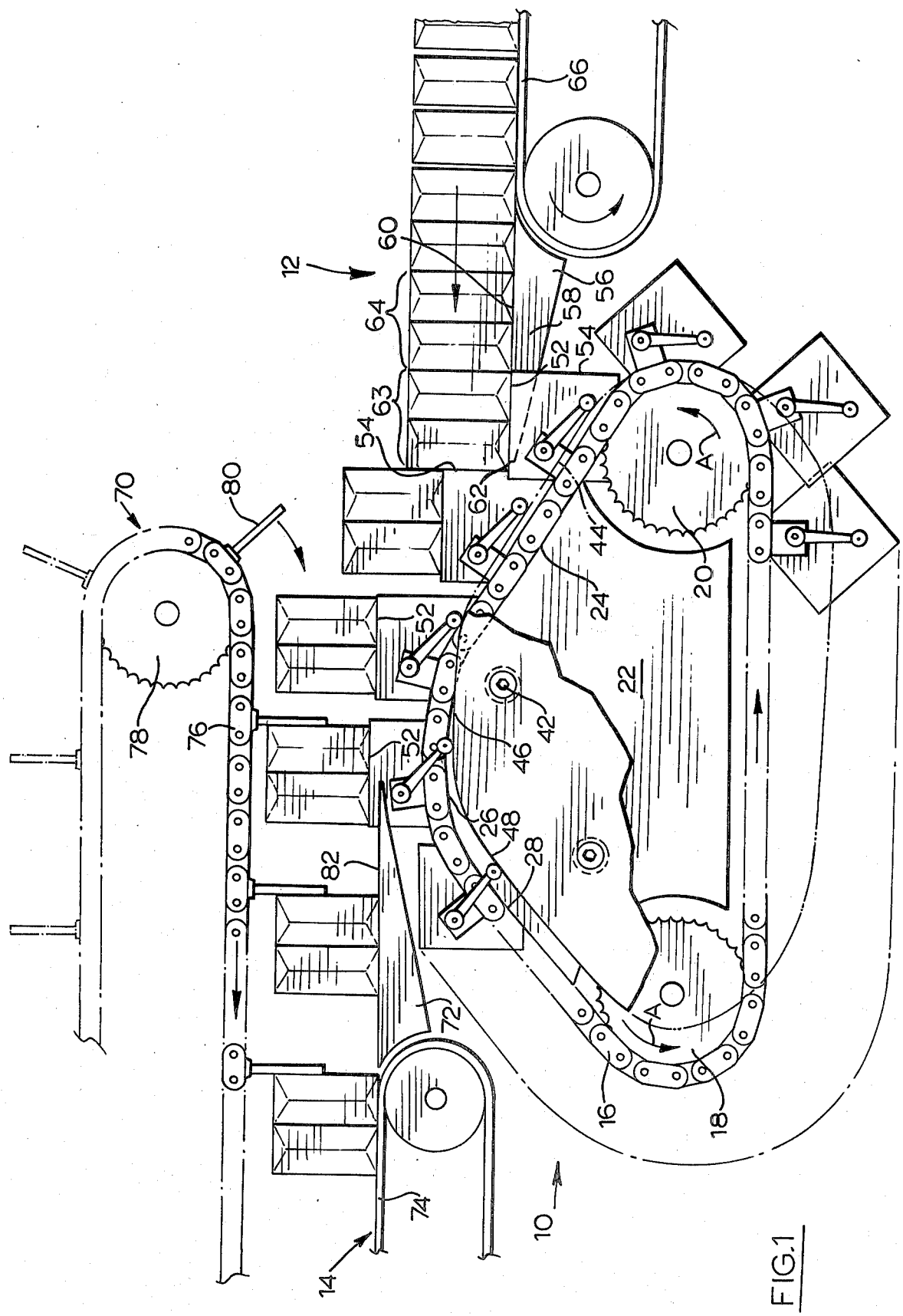

With reference to FIG. 1 of the drawings, the reference numeral 10 refers generally to a load transfer mechanism for transferring load units from a load accumulating station 12 to the forward run of a loading conveyor 14 of a machine for end loading cartons or the like.

The load transfer mechanism 10 of this embodiment includes an independent escalator mechanism whereas in the embodiment described with reference to FIGS. 5, 6 and 7 of the drawings, the escalator mechanism forms an integral part of the loading conveyor.

With reference to FIGS. 1 through 5, it will be seen that the escalator mechanism consists of a pair of conveyor chains 16, each of which is supported by sprockets 18 and 20 and a guide plate 22. The guide plate 22 has an escalating support surface 24, an upper support surface 26 and a downwardly inclined support surface 28. In use, the chains 16 are driven about sprockets 18 and 20 at a constant speed in the direction of the arrows A so that the chain has an escalating run extending upwardly along the escalating surface 24 and a generally horizontal run extending along upper support surface 26.

A plurality of brackets 30 are mounted on each chain 16 and support shafts 32 are pivotally mounted in brackets 30 and extend transversely therebetween. Rocker arms 34 project outwardly from the shafts 32 and have cam followers 36 rotatably mounted at the outer end thereof. A cam plate 38 is bolted to the chain support plate 22 by bolts 42 and is spaced outwardly therefrom by spacers 40. The cam plate 38 has a cam track extending about the periphery thereof which includes an upwardly inclined escalating track portion 44, an upper generally horizontal portion 46 and a downwardly inclined portion 48. The cam follower 36 is adapted to follow the contour of the cam track at least along the escalating portion 44, generally horizontal portion 46 and downwardly inclined portion 48 so that the angular position of the support shafts 32 is determined by the profile of the cam plate 38.

A plurality of support plates 50 are rigidly secured with respect to each shaft 32. Each of the support plates 50 has a bottom support face 52 which serves to support the bottom of the items which are to be engaged by the escalator mechanism in use and an end stop face 54.

The profile of the cam track is such that the bottom support face 52 is located in a generally horizontal plane and the end stop face 54 is located in a generally vertical plane as the associated shaft 32 is driven along the upwardly inclined and the generally horizontally oriented and downwardly inclined portions of the chain guide.

As shown in FIG. 1 of the drawings, the support plates 50 are proportioned so that when they are travelling along the upwardly inclined escalator run, the end stop face 54 of one set of support plates serves to limit the forward movement of items located on the bottom support face of the next following set of support plates.

A transfer platform 56 is located in the load accumulating station 12 and includes a plurality of support fingers 58, each of which has an upper support surface 60. The support fingers 58 are laterally spaced from one another so that the support plates 50 of the escalator mechanism may pass upwardly therebetween. With reference to FIG. 2 of the drawings, it will be noted that when the bottom support face 52 of a set of support plates 50 is located in the plane of the support surface 60 of the support platform, the discharge edge 62 of the support surface 60 is located substantially in alignment with the end stop face 54 of the preceding support plate 50. Similarly the end stop surface 54 of the support plates which have their bottom support surface 52 in the plane of the support surface 60 is located in alignment with the leading edge of the next load unit on the platform 56 so that as the leading load unit 62 begins to be elevated by the underlying bottom support surface 52 of its associated support plates 50, the stop face 54 of said associated plates limits the forward movement of the next following load unit 64 so that the next following load unit 64 cannot be pushed directly off of the platform by the subsequent load units. A load accumulating conveyor 66 serves to accumulate load units on the transfer platform 56.

A pusher unit, generally identified by the reference numeral 70, is provided for pushing the load units off of the escalator mechanism onto a receiving platform 72 and onto the forward run 74 of the loading conveyor. The pusher unit 70 consists of a pair of chains 76 (only one of which is shown) which extend around sprockets 78 and have pusher blades 80 mounted to extend transversely thereof. The sprocket 78 is located in relation to the escalator mechanism so that the pusher blades 80 pivot around the sprocket 78 in an arcuate path described above a portion of the escalating run of the escalator mechanism so that the pusher blades 80 may be located between adjacent load units when the load units are vertically spaced from one another by the escalator run. The receiving platform 72 is formed from a plurality of support fingers which are laterally spaced so that the support plates 50 may extend therebetween in travelling along the generally horizontal run 26 and the downwardly inclined run 28 of the escalator mechanism. It will be noted that the bottom support surface 52 of the support plates is elevated to a plane which is disposed above the support surface 82 of the receiving platform 72 so that the load units may be lowered onto the receiving platform 72 and driven therealong by pusher blades 80, the pusher blades 80 being driven at a speed which is greater than the forward speed of the escalator conveyor so that the space formed between adjacent load units by the escalator mechanism is further increased in transfer to the loading conveyor. It will also be noted that the axis of rotation of the sprockets 78 is positioned so that the pusher blade 80 extends in an arc disposed above the inclined escalator run of the escalator conveyor mechanism.

In use, it will be seen that the forward velocity of the escalator mechanism as it extends in the escalating plane is less than the forward velocity as it extends in the generally horizontal plane so that adjacent load carrying support members may be located so as to follow immediately one behind the other as they travel through the transfer platform along the upwardly inclined escalating run and accelerate away from the next following load carrying support as they travel along the generally horizontally extending portion. Travel along the inclined escalating path serves to vertically space the load units in the embodiment illustrated in FIGS. 1 through 5 to permit the pusher blades 82 to be located between adjacent load units. Travel along the generally horizontal run serves to longitudinally space the load units in the forward direction. Thus, the initial forward velocity of the support plates at impact with the load units in the accumulation station is substantially less than the subsequent velocity in the generally horizontal plane. The pusher mechanism of this embodiment may be used to further accelerate the load units in transporting them to the loading conveyor, thereby providing a three stage acceleration.

Figure 4:
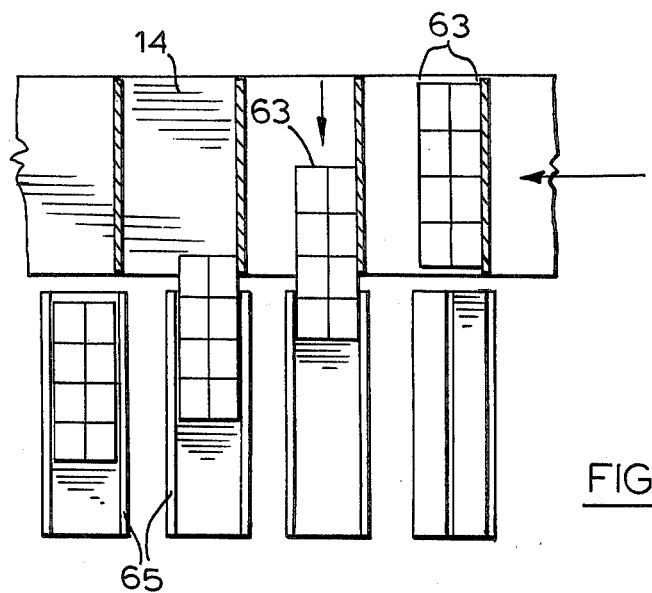
FIG. 4 is a pictorial plan view showing the end loading from the forward run of the loading conveyor.

As shown in FIG. 4 of the drawings, the load units 63 are discharged laterally from the forward run of conveyor 14 into mandrel forming buckets 65 of a wraparound carton loading machine of the type described in my U.S. Pat. No. 3,968,623. It will, of course, be understood that the load units 63 may be laterally discharged into the open end of a preformed end loading carton rather than the mandrel buckets 65 in certain loading machines.

Figure 5:
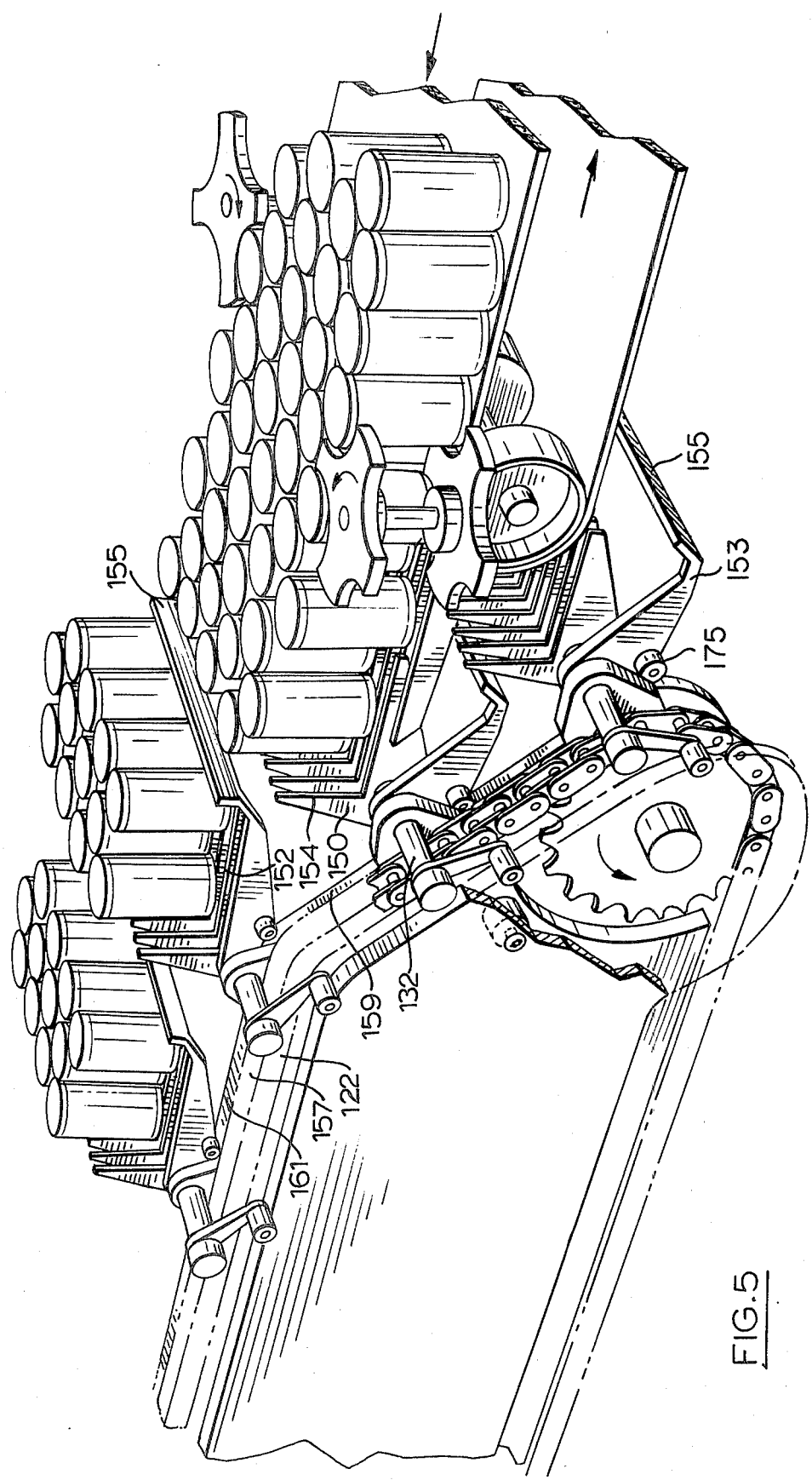
FIG. 5 is a pictorial plan view similar to FIG. 1 illustrating further embodiments of the present invention.

FIGS. 5, 6 and 7 serve to illustrate a further embodiment of the present invention in which the escalator run forms an integral part of the loading conveyor. In this embodiment, the load carrying support members 150 each have a bottom support face 152 and an end stop face 154. A back-stop is provided and consists of a pair of arms 153 located at opposite ends of support shaft 132 and a transverse bar 155. A cam track 157 is spaced inwardly from the chain support plate 122 and has an upwardly inclined section 159 and a generally horizontally extending section 161. A cam follower 175 is mounted on each of the arms 153 located adjacent the cam track 157 and serves to cause the backstop to pivot between the lowered position in which the transversely extending bar 154 is spaced below the support surface 152 to pass under the transfer platform 156 and the elevated position in which the transverse bar 155 projects upwardly from the bottom support surface 152 and serves to retain the load units on the load supporting device. The cam track 157 has a profile which serves to retain the back-stop bar 155 in a lowered position until a longitudinal space is provided between successive load carrying supports by reason of the acceleration of the load carrying supports resulting from movement of the load carrying supports from the escalator run to the forward run. As shown in FIGS. 6 and 7 of the drawings, the plane in which the end stop face 154 is located is aligned with the end 151 of the preceding support 150 so that successive end stop faces are positioned to engage the leading end of the next following load unit before the end 151 of the preceding support moves forwardly beyond the discharge end 162 of the platform 156 to an extent which would permit any portion of the next following load unit to become unstable.

From the foregoing it will be apparent that in both embodiments of the present invention the angularly inclined escalator run will have a velocity in the forward direction which is less than the forward velocity in the forward run so that the load supporting elements are permitted to travel through the load transfer station at a speed which is slower than the speed of forward movement in the end loading station. This permits a gradual acceleration of the load units to the high speed at which existing machinery is capable of effecting end loading of cartons.

The ratio of the speed of forward movement over the escalator run and that of the speed of forward movement in the forward run is a function of the angle of inclination $\sigma$ of the escalator run with respect to the plane of the forward run.

From the foregoing it will be apparent that the apparatus of the present invention provides a simple and efficient method of separating a predetermined load unit from an accumulated load and accelerating the separated load gradually to a high speed forward motion, while simultaneously spacing the thus separated load units in the longitudinal direction of forward movement so as to isolate each load unit from its next following load unit. This separation and longitudinal spacing of the load units is achieved by driving the load supporting devices along an angularly inclined escalator plane as they are driven through the load accumulating station to contact the load which they are to carry. In one embodiment, the escalator unit is separate and distinct from the main loading conveyor and in the other embodiment, it forms an integral part of the main loading conveyor. In both embodiments, all of the conveyors operate continuously and it is not necessary to bring any of the conveyors to a stop in order to receive or transfer the load units.

Numerous other advantages will be apparent to those skilled in the art.

What I claim as my invention is:

1. In a carton end loading machine having a loading conveyor for supporting and transporting a plurality of longitudinally spaced load units in a forward direction along a forward run which extends in a loading plane from a load accumulating station through a carton loading station, the loading conveyor also having a return run extending in a return plane located below the loading plane, a plurality of load carrying supports arranged at spaced intervals along said loading conveyor, feeding means for feeding items to said load accumulating station, the improvement of:
   (a) a transfer platform in said loading station, said transfer platform having a receiving edge for admitting items from said feeding means and a discharge edge opposite said receiving edge, said platform including a plurality of laterally spaced platform fingers extending inwardly from said discharge edge,
   (b) said loading conveyor including an escalator run which is angularly inclined upwardly and forwardly from said return run to said loading run,
   (c) said load carrying supports each comprising transversely extending support means pivotably mounted on said loading conveyor, a plurality of support elements mounted on each of said transversely extending support means at laterally spaced intervals therealong so as to pass between said laterally spaced fingers of said platform during movement along said escalator run, each said support elements including a base member and a stop member extending perpendicular to one another,
   (d) first cam follower means on each of said transversely extending supports for controlling the orientation of said base and front stop members,
   (e) a first cam track coextensive with at least a portion of said escalator run and said forward run and engaging said first cam followers as they are driven therealong to locate said base member in a generally horizontal plane and the forward stop member in a generally vertical plane as they are driven along said escalator run and along said forward run, (f) a back-stop associated with each load carrying support and comprising a transversely extending back-stop bar and support arm means supporting said back-stop bar for pivotal movement between a lowered position spaced below its associated base member and a raised position extending above its associated base member to limit movement of the load carried by its associated base member in a direction opposite to the forward direction, second cam follower means on each back-stop for controlling the orientation of said back-stop, second cam track means coextensive with at least a portion of said escalator run and said forward run for engaging said second cam follower means to move the back-stop member to the raised position after its associated base moves forwardly from the discharge edge of said transfer platform, (g) said transfer platform being disposed in a plane spaced below said loading plane a distance at least equal to $L \tan \sigma$ wherein L is the length of the load support surface of the base member in the forward direction and $\sigma$ is the angle of inclination of the escalator run with respect to the forward run.

2. In a carton loading machine having a loading conveyor for supporting and transporting a plurality of load units through a loading station in a longitudinally spaced relationship along a forward run which extends in a loading plane, a load accumulating station and means for feeding load units into the load accumulating station, each load unit having a predetermined length in said forward direction, the improvement of:

(a) a transfer platform in said load accumulating station disposed in a plane which is spaced below the loading plane and rearwardly from the forward run of the loading conveyor, (b) an escalator conveyor having an escalator run which includes a straight section followed by an arcuate section, said straight section extending forwardly and upwardly from below said transfer platform to said arcuate section which extends from the upper end of the straight section to the plane of said forward run of said loading conveyor, (c) a plurality of load supports mounted on said escalator conveyor and arranged to form a series of escalator steps along said escalator run, each step having a rearwardly directed stop face and a horizontally extending load support face extending rearwardly from its associated stop face, successive rearwardly directed stop faces being spaced from one another in said forward direction a distance equal to said predetermined length of load unit and being disposed above its associated load support face to engage a load unit driven thereagainst by said means for feeding load units into the load accumulating station such that during movement of said load support means along said escalator run at least one stop face is always presented to the load units feeding to said load accumulating station.

3. In a carton loading machine having a loading conveyor for supporting and transporting a plurality of longitudinally spaced load units in a forward direction along a forward run which extends in a loading plane to a loading station, a load accumulating station and means for feeding load units to the load accumulating station, the improvement of:

(a) a transfer platform in said load accumulating station disposed in a plane which is spaced below the loading plane and rearwardly from the forward run of said loading conveyor, (b) an escalator conveyor, (c) a plurality of load carrying support means on said escalator conveyor and movable with said escalator conveyor, (d) said escalator conveyor having an escalator run which includes a straight section followed by an arcuate section, said straight section extending forwardly and upwardly from below said transfer platform to guide said load carrying supports to and from said loading platform at a uniform forward velocity to engage and regulate the flow of load units across said platform and elevate selected load units from said platform at said uniform forward velocity, said arcuate section effecting a subsequent acceleration and consequent forward spacing of successive load carrying supports, (e) each load carrying support means including a base portion arranged to support the underside of load units in use and a front stop member arranged to limit forward movement of the load units, and a back stop associated with each load carrying support, said back stop comprising a transversely extending back stop bar and support arm means supporting said back stop bar for pivotal movement between a lowered position spaced below its associated base member and a raised position extending above its associated base member to limit movement of the load carried by its associated base member in a direction opposite to the direction of forward movement and means for pivoting the support arm means from said load position to said raised position shortly after its associated load carrying support is accelerated in said forward direction away from the next following load carrying support.

* * * * *